United States Patent

Chrosny

Patent Number: 5,999,706
Date of Patent: Dec. 7, 1999

[54] METHOD AND APPARATUS FOR SUBSTITUTING A 2-BYTE FONT CHARACTER STANDARD IN A PRINTER

[75] Inventor: Wojciech M. Chrosny, Orange, Conn.

[73] Assignee: Pitney Bowes, Inc., Stamford, Conn.

[21] Appl. No.: 08/846,197

[22] Filed: Apr. 28, 1997

[51] Int. Cl.[6] .................................................. B41B 15/00
[52] U.S. Cl. ........................ 395/110; 395/112; 395/115
[58] Field of Search ........................... 395/110–114, 102; 707/535, 542; 400/110, 109, 76, 692; 704/8, 5; 341/28, 22; 382/192, 185, 173, 224, 266; 345/171, 468, 128, 335–336, 340, 168, 157, 484

[56] References Cited

U.S. PATENT DOCUMENTS

| | | | |
|---|---|---|---|
| 4,951,202 | 8/1990 | Yan | 707/535 |
| 4,954,979 | 9/1990 | Eibner et al. | 707/542 |
| 5,119,296 | 6/1992 | Zheng et al. | 707/535 |
| 5,137,379 | 8/1992 | Ukai et al. | 395/110 |
| 5,171,092 | 12/1992 | Tasaki | 400/692 |
| 5,201,031 | 4/1993 | Kasaki | 395/110 |
| 5,285,387 | 2/1994 | Kurahara et al. | 707/535 |
| 5,321,807 | 6/1994 | Ando | 707/535 |
| 5,378,068 | 1/1995 | Hua | 400/110 |
| 5,410,306 | 4/1995 | Ye | 341/28 |
| 5,410,614 | 4/1995 | Chou et al. | 382/266 |
| 5,425,110 | 6/1995 | Spitz | 382/192 |
| 5,468,077 | 11/1995 | Motokado et al. | 400/76 |
| 5,475,767 | 12/1995 | Du | 382/185 |
| 5,488,363 | 1/1996 | Peng | 341/28 |
| 5,606,649 | 2/1997 | Tai | 395/110 |
| 5,706,413 | 1/1998 | Takabayashi et al. | 395/110 |

*Primary Examiner*—Leo H. Boudreau
*Assistant Examiner*—Ishrat Sherali
*Attorney, Agent, or Firm*—Charles R. Malandra, Jr.; Melvin J. Scolnick

[57] ABSTRACT

A hardware module includes a character map, a font and control codes in accordance with an established national standard for printing characters, to supplement or replace similar information stored in a printer in accordance with another established standard. Connection of the module to the printer changes the personality of the printer, from a printer operating in accordance with one standard for printing one set of characters, such as printing simplified Chinese characters used in mainland China in accordance with a GuoBiao Standard, to a printer operating in accordance with a second standard for printing another set of characters, such as printing traditional Chinese characters in accordance with a Chinese National Standard.

12 Claims, 5 Drawing Sheets

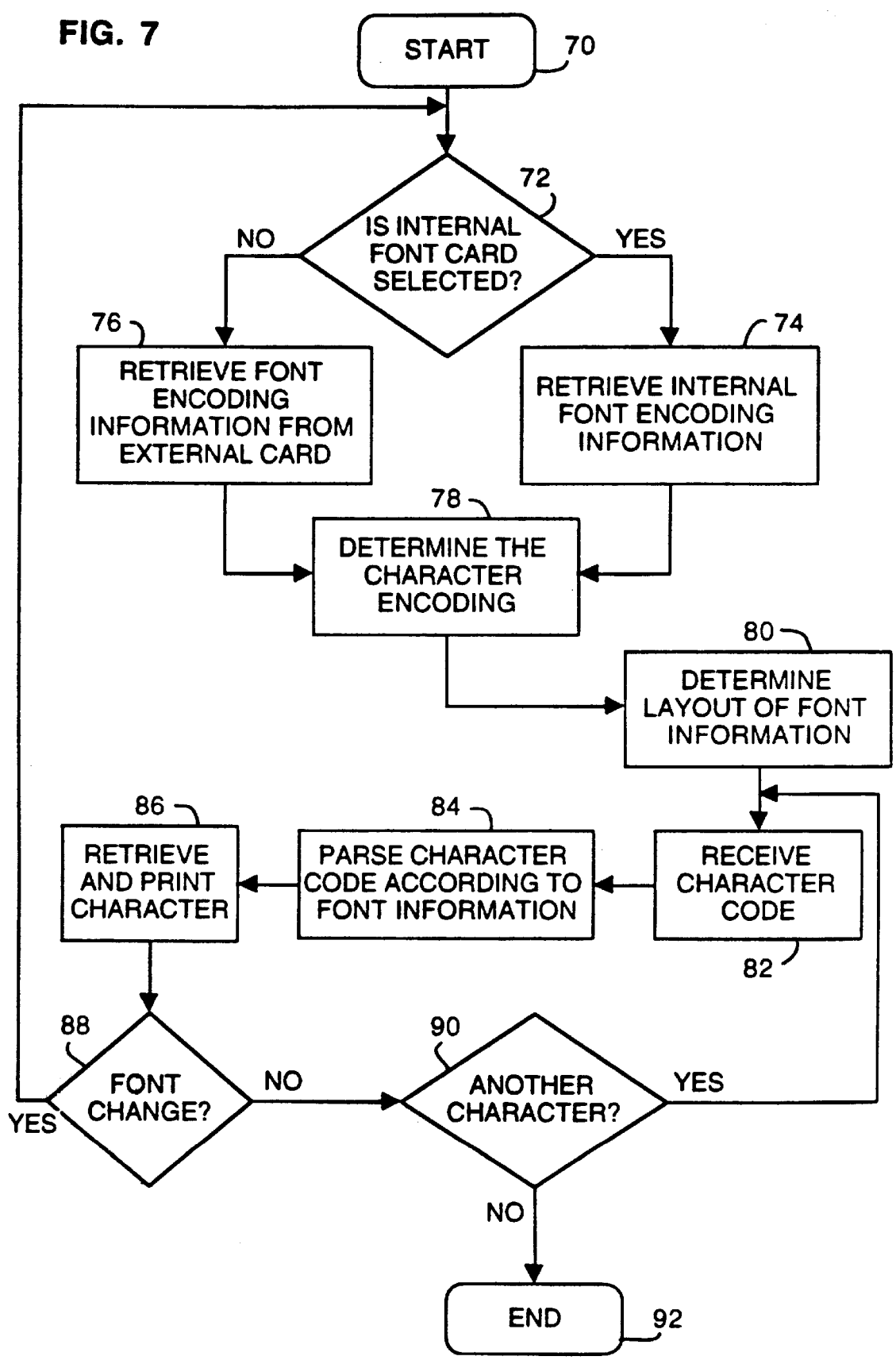

METHOD AND APPARATUS FOR SUBSTITUTING A 2-BYTE FONT CHARACTER STANDARD IN A PRINTER

BACKGROUND OF THE INVENTION

This invention relates generally to printers, and more particularly to apparatus for converting a printer personality, from that of a printer operating in accordance with a particular standard for a particular font resident therein to that of a printer operating in accordance with a different standard for a different font which appears to be resident therein, thus enabling the printer to print different character fonts as may be prevalent in different countries in accordance with different encoding standards used in the different countries. Still more specifically, the invention relates to apparatus for converting a single printer for a set of Asian characters, operating in accordance with a specific national standard, to operate in accordance with a different national standard for printing the same set or a different set of Asian characters in accordance with a different national standard.

Various standards are used throughout the world to encode a particular set of characters for printing by a printer having that set of characters as part of a font resident therein. Such standards typically encode characters in a 2-byte code, and thus have a capacity for identifying approximately 64,000 characters. For example, English characters are encoded using the ASCII standard in the US. Although encoding of the English language may be fairly standardized, however, such uniformity does not exist throughout the world with respect to the various character sets used for communication. More specifically, there does not exist uniformity in encoding of character sets in various Asian countries, whether or not using the same set of characters.

The character encodings used in countries with large sets of characters (e.g. Japan, China) have been evolving over many generations of computer technologies. The result is a large number of differing standards even within some countries. Current international efforts on creating unified encoding will result in another standard known as UNICODE. The new printers used in those countries typically operate in graphics mode in order to avoid implementation of the font and the implementation of a specific character encoding. However, operation in graphics mode results in a slower printing of textual documents. In that regard, it should be noted that in several Asian countries, similar character sets are used (although a number of differences exist between the sets), but that different encoding standards are used to represent these character sets. For example, Kanji characters are used in the Chinese language, but differences exist between the characters used in Taiwan and those used in mainland China, with still other differences distinguishing Japanese Kanji characters from those of Taiwan and mainland China.

While some of the characters are fairly identical, if more elaborate character concepts are considered, then the three cultures diverge in the manner in which the characters are drawn or represented. Thus, traditional Chinese characters are used in Taiwan and a simplified form of the characters is used in mainland China. Additionally, acceptable mainland Chinese text cannot be written with the Japanese character set, and so on. Such writings may be intelligible, or guessable, but are not acceptable from the standpoint of proper usage.

A number of reasons explain such diversity. More specifically, as different Asian economies have individually entered the computer age, the national character sets used in those countries were individually, and differently, encoded. In Japan, for example, inasmuch as individual companies have defined individual coding schemes while Japanese industry has defined a number of standards for encoding (known as JISxx, the Japanese Industry Standard) where xx designates a particular standard number, a number of different encoding protocols are used for the different sets of Japanese characters.

A Chinese National Standard (CNSxx) is used in Taiwan for encoding Chinese characters, where xx designates a particular standard number, with an added complexity arising from the fact that different standards represent the characters in the computer file system and in the printers.

In Korea, there are used particular Korean Standards (KSxx) to represent characters for printing by a printer, where xx designates a particular standard number.

In mainland China, a more recent entrant to the computer driven environment, there is used a somewhat simpler GuoBiao standard, which incorporates various beneficial features from previously developed standards of Japan and Taiwan.

For applications where high speed text output is necessary and graphics are needed only occasionally, the printer with embedded, fixed or variable size font will have a speed advantage where, for example, 2 printers print at the same speed and communicate at the same speed and both print characters composed of 24 pixels by 24 pixels (typical resolution required to print Asian characters). In order to print 1000 characters, the printer with embedded font will receive 2000 bytes plus some control codes. In comparison, the graphics printer will receive 72 bytes per character ×1000 characters for a total of 72,000 plus control codes. Assuming the same communication speed, the text for the printer with embedded font will be transmitted about 36 times faster.

Character encoding Standards used in Asia:

JIS X 0208-1990 (Japan) Defines 94 rows of 94 characters; total of 6,879 Characters.

S-JIS (Japan) Same set of characters as in JIS but with a modified layout for easier computer storage and processing.

BIG5 (Taiwan and Hong Kong) Defines 94 rows of 157 characters; total of 13,523 characters.

CNS 11643-1986 (Taiwan and Hong Kong) similar to BIG5 but used by commercial printers.

GB 2312-80 (The People's Republic of China) Defines 94 rows of 94 characters; total of 6,763 characters.

Each of these encodings uses 2 bytes to represent a particular character. However, each of the encodings differs in definition of the valid values of the first and second byte of the encoding.

For example:

| Encoding Standard | Valid Range for the 1 Byte (in Hexadecimal) | Valid Range for the 2 Byte (in Hexadecimal) |
| --- | --- | --- |
| JIS X 0208-1990 | 21–7E | 21–7E |
| S-JIS | 81–9F and E0–EF | 40–7E and 80–FC |
| BIG5 | A1–FE | 40–7E and A1–FE |
| GB 2312-80 | 21–7E | 21–7E |

In order to efficiently store the character descriptions (either bitmaps or other scaleable representation) only the defined characters need to be stored in the printer memory. When characters are laid-out sequentially in memory it is necessary to know what how to translate the received code into the location of the character's description. For example, code 2121 refers to the first character in JIS X 0208-1990 and in GB 2312-80, but the first character is referred to as 8140 in SJIS and A140 in BIG5. The 95 character is referred to as 2221 in JIS X 0208-1990 and in GB 2312-80, but it is referred to as 819F in SJIS and as A1C0 in BIG5.

It is important to note that, in general, the $n^{th}$ character in one encoding does not necessarily correspond the same character in another encoding. The characters are arranged in different orders in different countries, but some section may correspond. For example, Latin or Greek letters may be encoded in the same locations.

The Font Encoding information may contain:

(a) Character mapping (represented as a table of valid ranges, or as a subroutine that converts character code to the sequential number of the character);

(b) The Font defining the bitmaps of characters or other graphical representation of the character; and (c) Control Codes to operate the printer in the particular country. For example, the commands that switch the printer in and out of 2 byte mode operation may be different in different countries. Commands for changing from internal font to external font.

With this implementation, it is possible with a front panel switch or with a control command to change the printer from a Japanese to Traditional Chinese Printer while maintaining high speed capability.

Different encoding standards are thus used in the various Asian countries to encode the same characters, or various modifications thereof. However, though the characters may be the same or similar, the use of different codes precludes a document prepared in one country, e.g., mainland China, from being printed on a printer of another country (e.g., a Taiwanese printer) and precludes a printer manufactured to operate in one country from being able to operate in another country.

For example, a Japanese printer operating in accordance with JIS expects a character code of two bytes, with only 7 bits in each being significant. Thus, if information is sent to the printer which uses all 8 bits to represent a character, the Japanese printer may not print at all, or may print some incorrect characters. A printer in mainland China, on the other hand, expects all 8 bits to be provided, and expects the 8th bit to be set to 1. If that bit is not set to 1, a printer prepared for operation in mainland China will either print an unintended character or not print at all.

Additionally, because different character encodings are used in JIS, CNS and GuoBiao—these 3 encoding schemes map the characters in totally different locations from each other —e.g., location 2000, 3500, or 1000 may be used by the three encoding schemes to encode the same character. The following provides an explanation of underlying concepts of such character encoding schemes.

Character encoding as described herein provides significant advantages in storage space. For example, if representing a character as a graphic, using an array of 24×24 (i.e., 576) pixels, one would need 72 8-bit bytes (576 bits) to describe all 576 pixels of the character. However, the known encoding techniques use 2 bytes—from 0000 through FFFF (in hexadecimal) which can represent 65,000 locations.

In Japan about 7,500 characters are used, requiring only a subset of the total space addressable by 2 bytes. The Japanese standard effectively defines the characters contiguously from character 0 to character 7500. However, the 2-byte codes by which the characters are recalled or addressed are not totally contiguous, starting at 2020H and proceeding from there, with gaps. Certain decoding algorithms are thus needed to know that, if receiving a Japanese coding, character 4031 in the sequentially laid out memory is in location 1500.

The specific encoding schemes are thus significant since the way the characters are laid out differs from the standard of one country to that of another country. That is, the coding scheme effectively provides a translation from a code to the actual serial location, or sequence number, and thus to the location where the information for that character is stored.

Conversion of characters from one Asian character set to another is known in the prior art, although such conversions are made in the conversion device operating under the prevailing encoding standard.

For example, it is known to convert Japanese phonetic Kana characters (e.g., Hiragana and Katakana) to Kanji (hieroglyphic) characters. U. S. Pat. No. 5,321,801 discloses a document processor system which incorporates conversion of inputted Kana characters to Kanji. The inputted characters are displayed in their input form and, after conversion, are thereafter displayed in their converted form.

The use of a standard interface between such a conversion program and a body of a text displaying application program is described in U. S. Pat. No. 5,285,387, which shows the conversion program itself separately from, and interfacing between, an input keyboard and the user interface in a multi-window, multi-tasking environment. As shown therein, prior art programs provided a different user interface for each language, such as Japanese and Korean, within the application program. As further described, it is known for the applications program and the conversion program to operate in different windows, and to pass information (including font information) to one another.

Generation of ideographic Chinese characters and selective printing thereof by a word processor is disclosed in U. S. Pat. No. 5,378,068.

U. S. Pat. No. 5,116,296 identifies a phonetic system for (Pin Yin) encoding Chinese characters, and notes the existence of different phonetic symbols for denoting these characters in Taiwan and in other Asian countries. To encode the Chinese characters, the disclosed system categorizes the same in terms of fundamental strokes or components.

None of the above references, however, considers the possibility of printing the same set of characters in accordance with different encoding standards as may prevail in different countries, or of printing different sets of characters in accordance with such different encoding standards.

Thus, in Asian countries, printers deal with thousands of ideographic symbols. For example, more than 7,000 characters are supported by Japanese printers, and similarly in mainland China. However, in the traditional Chinese language, as used in Taiwan and Hong Kong for example, more than 13,000 characters are required to be supported by a printer. Accordingly, a character representing the concept of the sun, for example, has a different 2-byte standard representation in China, in Japan, and in Taiwan. For example, in accordance with one standard the sun character may be represented by the code 1000H, while in another the code may be 2041H—so that the same character may have different code representations, which must be recognized by printers operating in the separate countries to print the same character.

Further, while some simpler characters which convey basic meaning, e.g. sun, may look very much the same in one country and another, other characters may have been dropped from one country to another, or may have calligraphy which is different in a way that is significant to a native reader and may preclude or hinder proper reading when improperly used. Thus, the prior art has failed to address issues relating both to encoding characters and to the look and feel of the characters as well.

Finally, while font-changing cards may be available for some printers, such cards do not change the "personality" of the printer. That is, when a font-changing card, or module, is connected to a printer, the printer continues to respond to the same coding scheme, but produces differently designed (differently shaped) characters, or even different characters, for codes presented in accordance with that same coding scheme. In fact, the modules do not change the encoding—so that a single byte code of 41H, calling for an upper case A, may result in a different looking A, or may result in printing of a symbol if a mathematical symbol card is provided.

However, in case of US printers for example, the coding doesn't change regardless of font and continues to adhere to the ASCII standard. Similarly, in China, a printer with such a font-changing card continues to understand only the GuoBiao code.

That is, in the prior art font-changing cards it is assumed that, if a particular code is sent, there will be printed some symbol, which may differ from font to font. There is no provision, however, to assure that a printer having an internal software architecture allowing it to read the information from a card or from an internal font in accordance with one coding scheme, e.g., ASCII, would be able to print the same characters in response to information provided in accordance with another coding scheme, e.g., GuoBiao. That is, the printers in one country respond to differently formatted sets of two-byte codes than the printers of another country.

From the foregoing, it is clear that prior art printers are dedicated to one particular market—or that (in the alternative) such prior art printers may be forced to deal with characters as graphics, and thus to require an inordinate amount of time to print the same.

The prior art has thus failed to provide a printer capable of operating in a number of countries under a number of different standards for printing the same (or slightly modified) set of characters under each of a plurality of sets of available encoding standards therefor. More specifically, the prior art has failed to provide a plurality of character encoding sets which are effectively embedded in a single printer to permit a single printer to have, at the same time, an understanding of encoding standards of different countries so as to be able to mix and match protocols which the printer understands.

There is thus a need in the prior art for a printer having a built in capability to accept and understand different coding schemes, to produce a first character within one character set in response to a particular character code when using a first coding scheme (e.g., in mainland China) and, when given a second coding scheme, to produce a second character within a second character set in response to the same particular character code, where the second character may be different from the first character, as set forth by the second coding scheme, such as production of one character in accordance with a first code standard of mainland China when a particular code is received and production of a second character in accordance with a second code standard of Taiwan when the same code is received and the printer is provided with information identifying operation to be in accordance with the second code standard. Thus, it is an object of this disclosure to provide an approach by which the encoding information is stored together with the font and which can be stored inside the memory of the printer as well as on external memory modules.

SUMMARY OF THE INVENTION

It is accordingly an object of the present invention to provide a printer capable of understanding a plurality of particular encoding schemes from a plurality of particular countries and to print a character in response to a particular character code in accordance with a selected one of said plurality of encoding schemes.

It is another object of the invention to provide improved methods and apparatus for producing a first character within a first character set in response to a particular character code when using a first coding scheme and for producing a second character within a second character set in response to the same particular character code when using a second coding scheme, where the second character may be different from the first character.

It is a more specific object of the invention to provide a module to permit a printer, which produces a first character within a first character set in response to a particular character code when operating in an environment using a first coding scheme, to produce a second character within a second character set in response to the same particular character code when using a second coding scheme, wherein the second character may be different from the first character in accordance with differences between the first and second coding schemes.

It is still another object of the invention to provide an improved printer for producing characters from one or another character sets corresponding to one or another encoding schemes in accordance with a front panel (or menu) selection by a user—thus to provide an apparatus operating as two different printers in two different environments.

It is an additional object of the invention to provide an improved printer for producing characters from one or another character sets corresponding to one or another encoding schemes in accordance with a command from an application software for executing an encoding scheme selection.

In accordance with the invention, there is provided a printer connected for operating in accordance with a plurality of encoding schemes for printing a character in response to a particular character code in accordance with a selected one of said plurality of encoding schemes.

In accordance with another aspect of the invention, there is provided a module to permit a printer, which produces a first character within a first character set in response to a particular character code when operating in an environment using a first coding scheme, to operate in accordance with a second coding scheme and to produce a second character within a second character set in response to the same particular character code, wherein the second character may be different from the first character in accordance with differences between the first and second coding schemes.

Preferably, a module in accordance with the invention includes storage identifying character mapping, font information, and control codes for the second coding scheme.

In accordance with still another aspect of the invention, there is provided an improved printer for producing characters from one or another character sets corresponding to one or another encoding schemes in accordance with a front panel (or menu) selection by a user.

In accordance with an additional object of the invention, there is provided an improved printer for producing characters from one or another character sets corresponding to one or another encoding schemes in accordance with a command from an application software for executing an encoding scheme selection.

In accordance with still another object of the invention, there is provided a printer preferably including an internal software control section responsive to a panel switch or user selection, or to a software switch from an application, for accessing information provided by a plug in module for encoding and decoding print characters.

These and other objects, features and advantages of the present invention will become readily apparent to those skilled in the art from the following description and drawings, wherein there is shown and described a preferred embodiment of the invention, simply by way of illustration and not of limitation of one of the best modes (and alternative embodiments) suited to carry out the invention. The invention itself is set forth in the claims appended hereto. As will be realized upon examination of the specification and drawings and from practice of the same, the present invention is capable of still other, different, embodiments and its several details are capable of modifications in various obvious aspects, all without departing from the scope of the invention as recited in the claims. Accordingly, the drawings and the descriptions provided herein are to be regarded as illustrative in nature and not as restrictive of the invention.

BRIEF DESCRIPTION OF THE DRAWINGS

The accompanying drawings, incorporated into and forming a part of the specification, illustrate several aspects of a preferred embodiment of the present invention and, together with description, serve to explain the principles of the invention. In the drawings:

FIG. 7 is a flowchart of the operation of the printer of FIG. 4.

DETAILED DESCRIPTION OF THE PREFERRED EMBODIMENTS

Figure 1:
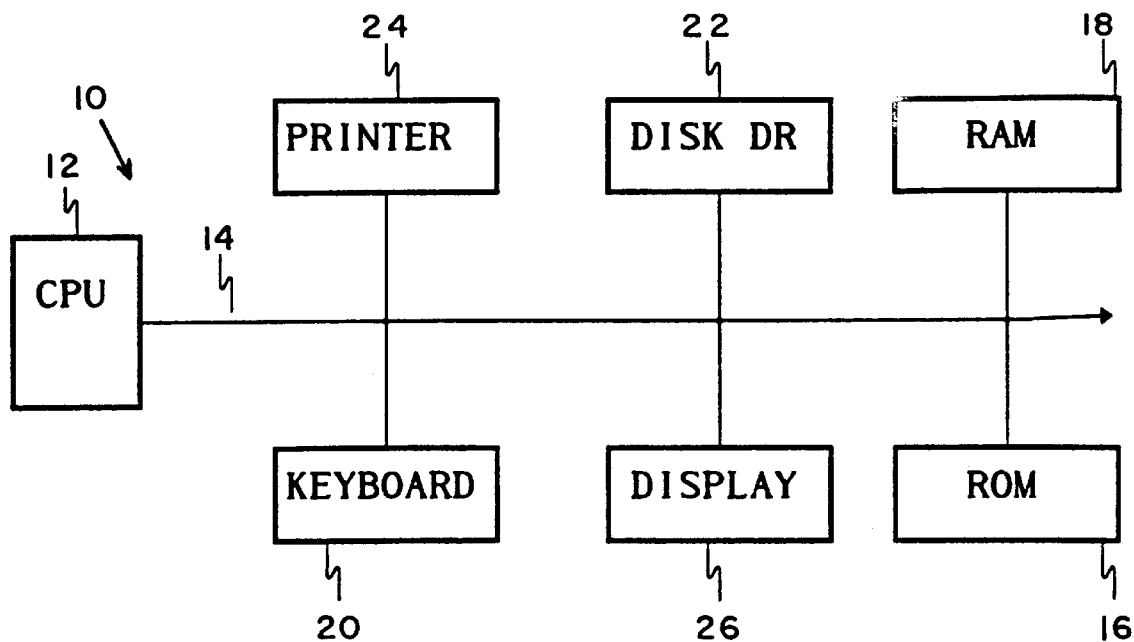
FIG. 1 shows a typical configuration of a computer driven environment of a printer.

Referring now to the drawings, there is shown in FIG. 1 a typical prior art configuration of a computer system 10 used in conjunction with a printer. As shown therein, a typical configuration of such a system may include a CPU 12, connected by an internal bus to a number of components. The components connected to the CPU typically include a ROM 16 (read-only memory), which stores various programs, data, and other information necessary to operate the system. Also connected to the CPU 12 via bus 14 is a RAM 18 (random-access memory), for storage of various changeable information and of various operating instructions and commands for the CPU. A keyboard 20 illustrates one form of input device for inputting information to the system. A disk drive 22 is shown to illustrate further replaceable storage typically used with a computer system. When the system 10 outputs information, two forms of output include output on paper or other media via a printer 24, of any known type such as an impact printer, a dot matrix printer, a thermal printer, an ink jet printer, a laser printer or the like, and output of display information on a display device 26, such as a CRT, LCD, LED or the like. As illustrated by the arrowhead at the end of bus 14, system 10 may communicate with other such systems, such as by use of modems or other communication devices (not shown).

Each of the above elements is well known and no further description is necessary. Indeed, numerous variations of system configuration, including addition or deletion of many elements to or from the system, are known and are contemplated herein. However, it should be recognized that with such variations system may represent any application of a computer, such as for control of large scale industrial equipment, smaller scale office equipment, and anything in-between. Each such application is contemplated for use of the invention. One particular application of a computer system, and the invention hereinafter described, is in postage metering devices. However, the invention is not necessarily limited to such an application.

Figure 2:
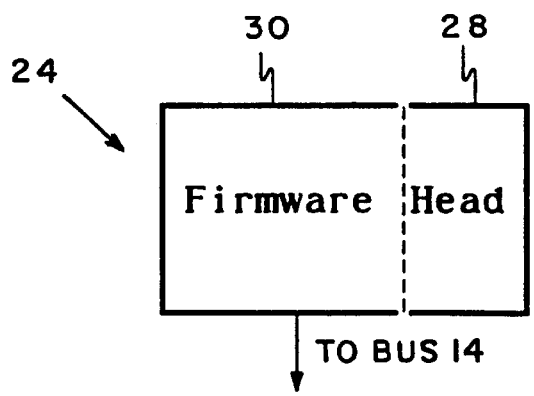
FIG. 2 is a symbolic representation of a typical computer driven printer.

FIG. 2 shows a typical computer-driven printer 24. As is known in the art, such a printer has a printing mechanism, illustrated in FIG. 2 as print head 28. As above noted, print head 28 may represent any device for imparting information to a print medium, such as an impact print mechanism, a dot matrix printer, a thermal printer, an ink jet printer, a laser printer or the like. The specific print head is not a part of the invention and may be of any type now known or hereafter developed. Print head 28 is controlled by firmware 30, resident in printer 24, as well as by CPU 12, which may direct one or more of the elements of system 10 to transfer data to the printer to be printed.

As is known in the art, a print controller (not shown) may also be used, and printer 24 may include a memory in addition to the memory represented by firmware 30 (e.g., software stored in a ROM), for storage of data received for printing from the system.

Figure 3:
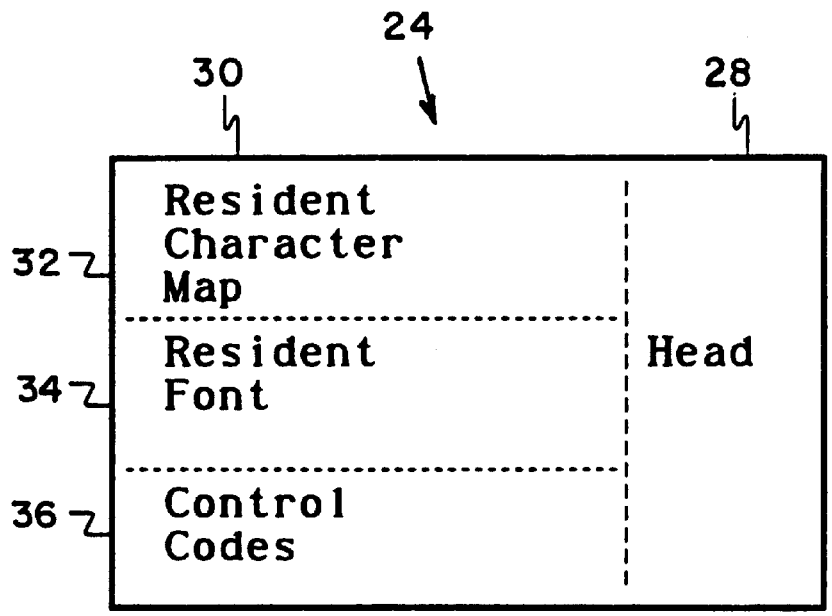
FIG. 3 illustrates typical components of a printer shown in FIG. 2.

FIG. 3 illustrates typical components of firmware 30 included in a typical printer of the type shown in FIG. 2. As shown in the Figure, the printer includes a resident character map 32, a resident font 34, and various control codes 36, provided to improve the speed of transmission of information to the print head 28 as hereinabove described. These components of a typical printer are known and thus are not further described herein.

Figure 4:
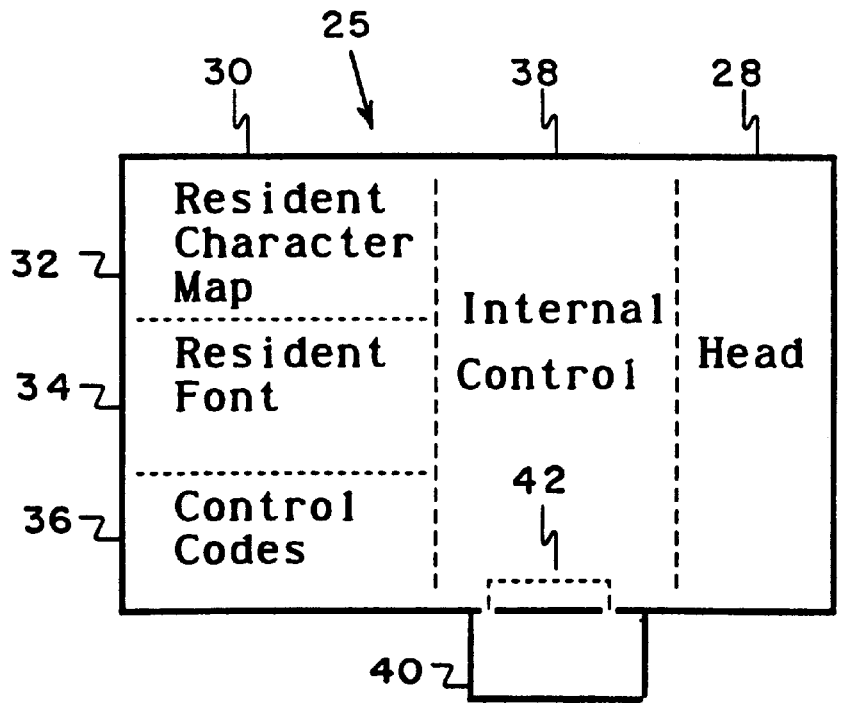
FIG. 4 shows a printer in accordance with the invention.

Referring now to FIG. 4, shown therein is a printer 25 usable in accordance with the invention; the flow of the printer operation is shown in FIG. 7. As illustrated in FIG. 4, a printer 25 usable in accordance with the present invention includes the components of a typical printer 24, along with an additional internal control section 38, and an input port or connector 40, for receiving an external module described below.

Internal control section 38 preferably includes a known type of arrangement 42 for sensing connection of an external module 44 (shown in FIG. 5) to connector 40.

Figure 5:
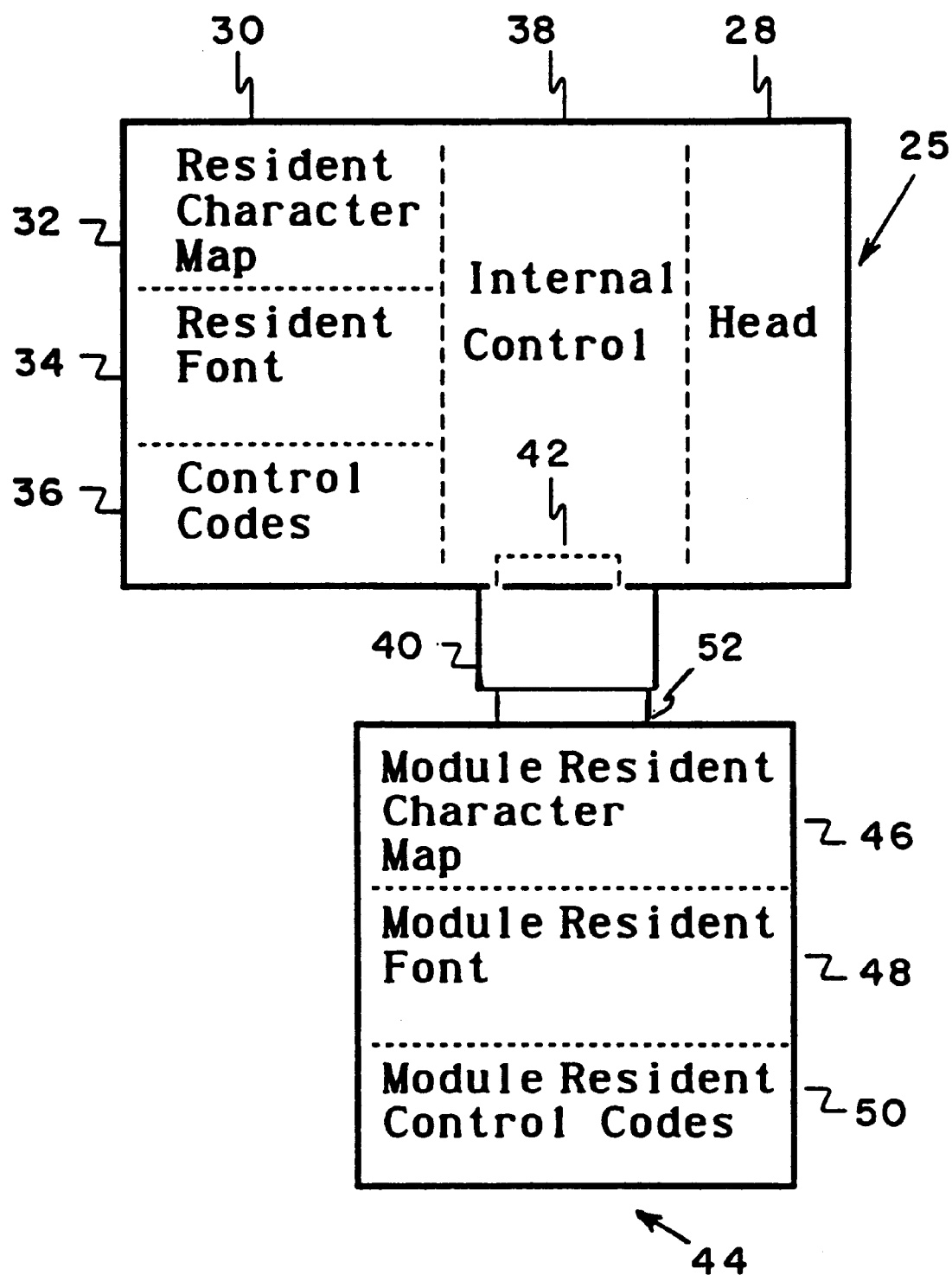
FIG. 5 shows an external printer module in accordance with the invention as connected to the printer of FIG. 4.

As seen in FIG. 5, an external module 44 includes a module resident character map 46, a module resident font 48, and module resident control codes 50 therein, similar to the components of firmware 30 which are resident in the printer. Module 44 is connected to input connector 40 of printer 25 via a connector 52. By providing a module resident character map 46, a module resident font 48, and module resident control codes 50 which are different from the same elements of firmware 30, the invention permits printer 25 to function as a completely different printer. In accordance with this embodiment of the invention, there is thus provided a plug in hardware module 44 which contains the character information as well as the appropriate description of how to encode and/or decode those characters.

That is, in accordance with the invention, the specific information and control data which impart a particular personality to a printer and which are stored in printer firmware are augmented or replaced by different information and control data stored in an external module connected to the printer, thus imparting a different personality to the printer. Accordingly, by connecting module 44 to printer 25 the invention changes the personality of the printer, converting a printer which operates in accordance with one standard (e.g., CNSxx) to another (e.g., JISxx) and permits the printer to print in accordance with the other standard.

Having described the concept of the invention, the manner in which the invention is implemented will become fairly clear. Particularly, internal control 38 effectively directs information and control data ("data") provided to print head 28 and selects such data to be the data from firmware 30 or the data from an external module 44. Arrangements for such re-direction are well known, and may include a software routine for detection of operation of a switch, or other circuit, which is closed (or opened) by insertion and/or removal of module 44 from connector 40. Indeed, the internal control section 38 and arrangement 42 may include hardware control of a switched data path to print head 28.

As will be appreciated by those of ordinary skill in the art, such a configuration may include a sequence of single pole double throw switches, one for each line to be connected to print head 28. The various switches each include a throw arm having an output terminal connected to an appropriate input line to print head 28, and two input terminals, one connected to a line from connector 40 and the other to an output line from firmware 30. The throw arms of the switches, which are switched together to be connected in unison to one of the two input terminals, may thus be activated upon coupling of connector 52 and connector 40, thereby providing a hardware control of data flow to head 28.

When such an arrangement is provided between a module 44, provides a connection between module 44, when connected to connector 40, and print head 28 and disconnects firmware 30 from the print head 28, thus enabling transfer of information from any of map 46, font 48 and/or codes 50 of module 44 to the print head 28 and disabling transfer of information from any of map 32, font 34 and/or codes 36 of firmware 30 to the print head. As such, internal control 38 effectively directs information and control data ("data") provided to print head 28 and selects such data to be the data from firmware 30 or the data from an external module 44.

Of course, it will be appreciated that rather than relying on mechanically actuated switching as hereinabove described, arrangement 42 of internal control 38 may be a software routing which senses presence of a voltage, or of a particular signal, on one of the connecting pins of connector 40. In response thereto, internal control 38 may provide software switching of the connection to print head 28, thus achieving the same selective personality change as hereinabove described when a module 44 is connected to printer 25.

Figure 6:
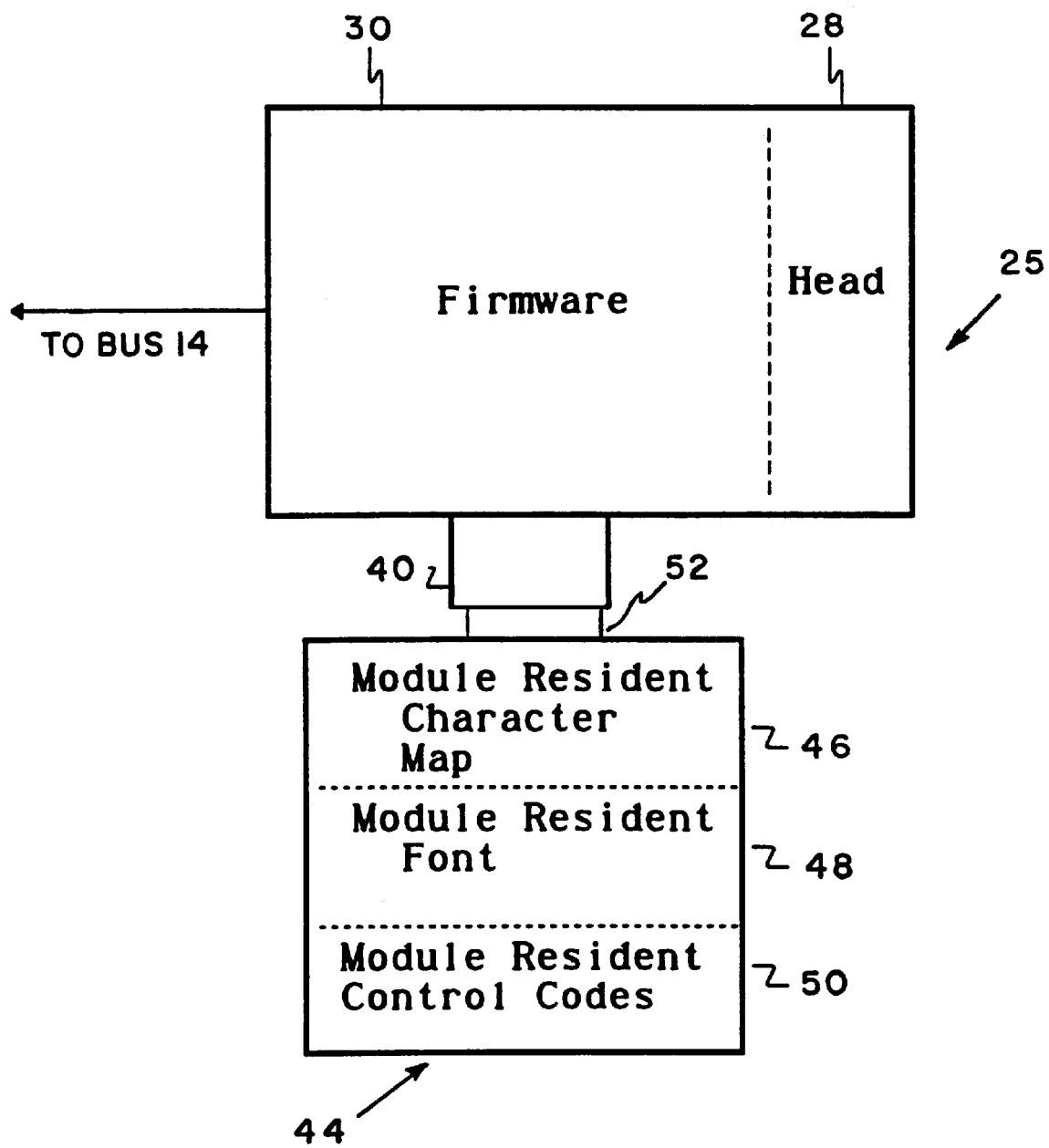
FIG. 6 illustrates an alternate embodiment of the inventive structure of FIG. 5.

FIG. 6 illustrates an alternate embodiment of the inventive structure of FIG. 5. In accordance with this modification, personality control over the printer may be exercised by an operator, whether via keyboard 20 or by a control panel switch (not shown), who provides an input signal to control the firmware 30 of the printer to accept data from the module 44 connected thereto, rather than from the character map, font and control codes embedded in the printer. The operator's input may be provided directly to the printer via bus 14, or to CPU 12 which, in response thereto, transmits a personality control signal to the printer, causing the printer to operate in accordance with data provided by module 44.

Of course, CPU 12 may provide the input signal to control the source of the data for printer 25. This may be done when running a particular application on system 10, so that when a first application is being executed, the printer may operate in accordance with the data embedded therein while, when a second application is being executed, the printer may operate in accordance with the data embedded in a particular external module. To attain even greater flexibility, the CPU may generate an alarm or display to alert an operator to a need for adding, or changing, the module to be plugged in to the printer.

It should be further appreciated that, although module 44 is shown as being connected directly to the printer, the module may be connected to another element of system 10, whether to one of the elements shown in FIG. 1 or to an element not shown therein. In such a modification, there is preferably provided a separate data path from the module to connector 40, or to another input port of the printer, in order to avoid tying up system resources.

As above noted, it is not necessary that all of the information of the firmware be replaced by data from an external module. In the above described example, character sets are embedded in the module along with the character definitions. However, in some circumstances it is only necessary to change the calligraphy used to create the characters.

For example, if a mainland Chinese font is built into the printer, and traditional characters are provided in the plug-in module, the representation of the characters is also encoded with font information, either as stored in the printer's internal memory (i.e., firmware 30) or on the module 44, and the encoding which recalls the character for mainland Chinese as opposed to Taiwanese standards is identified within the data structure which defines which character set is being dealt with.

Moreover, the application software running on system 10 has knowledge of whether it is dealing with traditional characters from Taiwan or with simplified characters from mainland China. If the application recalls the simplified mainland characters, it needs to know that these characters are the built in printer font, and to use that encoding. If the application switches to the traditional characters of Taiwan, by providing an appropriate control code it can switch to the plug in module, and use the traditional encoding codes to recall these characters.

To appreciate applications of the invention, it is noted that, in accordance with some application programs, a user working with documents of various languages (e.g., Japanese and Chinese documents) could set up the computer system to include different versions of Windows (e.g., Japanese and Chinese), and bring up a Japanese version of Windows, then a Chinese version and then an English version, as desired.

Under such an operation, the present invention permits a user to create a Japanese document on Japanese Windows, using Japanese drivers which do all the translation from document information to printer codes, and then print out the Japanese document on the printer. Then, to generate a Chinese document, the user may switch to Chinese Windows, use the drivers therein and the CNS encoding of the inventive module, and print the Chinese document on the same printer, as if it were a Chinese printer in compliance with CNS.

Moreover, some applications allow mixing of languages within the same document. It should be appreciated that, under such an environment, when language switching is accomplished using the embodiment of FIG. 6, the document language may be switched between the embedded font and the external font via computer commands. To enable efficient utilization of the invention along this line, the software application running on the system 10 should be aware of this capability.

Turning to FIG. 7, there is shown the general flow of the operation of the printer 25. The flow begins at step 70 and advances to a query at step 72. At step 72, the system queries as to whether an internal or an external font card is to be selected. If the response to the query is that an internal font card is to be selected, then the system advances to step 74 where internal font encoding information is retrieved. If, however, the response to the query at step 72 is that an external font card is to be selected then the system advances to step 76 where font encoding is retrieved from an external font card. Both steps 74 and 76 advance to step 78.

At step 78, the character encoding is determined; the system then advances to step 80 where the layout of the font information is determined. The system receives a character code from the encoding source corresponding to the determined character code and layout of steps 78 and 80. The received character code is parsed at step 84 according to the font information; the system then retrieves and prints the required character at step 86.

From step 86, the system advances to a query at step 88 which asks if the font is to be changed. If the response to the query is "YES, " then the system returns to the query at step 72; if however, the response to the query at step 88 is "NO," then the system advances to step 90. At step 90, the system further queries as to whether another character is required. If the response to the query is "YES," then the system returns to step 82 and awaits reception of the next character code; if however, the response to the query at step 90 is "NO," then the system advances to step 92 and ends the session.

The foregoing description of the preferred embodiment of the invention has been presented for purposes of illustration and description. It is not intended to be exhaustive or to limit the invention to the precise forms disclosed, since many modifications or variations thereof are possible in light of the above teaching. The embodiments described herein were chosen and described in order best to explain the principles of the invention and its practical application, thereby to enable others skilled in the art to utilize the invention in various embodiments and with various modifications as are suited to the particular use contemplated therefor. It is intended that the scope of the invention be defined by the claims appended hereto, when interpreted in accordance with the full breadth to which they are legally and equitably entitled.

What is claimed is:

1. A printing system for printing multiple-byte character fonts, said system comprising:

(a) a set of resident information designating a font and a set of encoding data embedded therein, (b) a connection path between the said resident information and a printing means for printing said selected resident information or said selected alternate information in accordance with said selection's encoding characteristics, (c) an input means for receiving alternate information designating at least one of an alternate font and alternate encoding characteristics; and (d) control means for controlling selection of said resident information or said alternate information to be provided to said printing means.

2. The printing system of claim 1, said printing system further including a memory storing said resident information and connected to the print head by said connection path, wherein said control means comprises means responsive to connection of a source for said alternate information by changing a data path to the print head, by breaking said connection path from the memory to the print head and establishing a connection from said source to the print head.

3. The printing system of claim 2, wherein said source comprises a hardware module external to said printing means, said hardware module including storage for said alternate information.

4. A printing system, including a printer having a print head, for printing multiple-byte character fonts, said system comprising:

(a) a hardware module external to said printer, said hardware module including storage for alternate information designating at least one of an alternate font and encoding characteristics;

(b) means for detachably connecting said hardware module to said printer, thereby providing said alternate information to said print head via an input means for receiving said alternate information designating at least one of said alternate font and said alternate encoding characteristics; and (c) control means for controlling selection of said resident information or said alternate information to be provided to said printer.

5. A computer operated printer in accordance with claim 4, further including selection means for selectably providing said resident information or said alternate information to the print head.

6. A computer operated printer in accordance with claim 5, wherein said selection means is responsive to connection of said hardware module to the printer by establishing a connection from said hardware module to the print head and by breaking said connection path between the resident information and the print head, thereby to provide said alternate information to the print head when said hardware module is connected thereto.

7. A computer operated printer in accordance with claim 6, wherein the printer includes a memory storing said resident information, further comprising a module memory in said hardware module for storing said alternate information.

8. A computer operated printer in accordance with claim 7, wherein the memory in the printer stores a character set including a character map, a resident font, and control codes in accordance with a first standard, and said module memory stores a character set including a character map, a resident font, and control codes in accordance with a second standard different from said first standard.

9. A computer operated printer in accordance with claim 8, wherein said character set stored in said module memory is the same as said character set stored in the memory in the printer.

10. A computer operated printer in accordance with claim 8, wherein said character set stored in said module memory is different from said character set stored in the memory in the printer.

11. A hardware module for changing a printing standard controlling operation of a printer, comprising:

(a) storage means for storing module information corresponding to an established standard designating a character map, a font, and a set of control codes for enabling the printer to print said font in accordance with said established standard;

(b) connecting means for detachably connecting said hardware module to the printer, thereby to provide said module information to the printer;

(c) control means for controlling selection of said character map, said font, and said control codes or a set of alternate information to be provided to said printer; and (d) an input means for receiving said set of alternate information designating at least one of an alternate font and a set of alternate encoding characteristics.

12. A hardware module in accordance with claim 11, wherein the printer includes a print head and an internal memory for storing resident information corresponding to a particular standard designating a character map, a font, and control codes causing the print head to print in accordance with said particular standard, said particular standard differing from said established standard, the printer further including a data path from said connecting means of said hardware module to the print head thereof, and means for providing said module information to the print head, whereby connection of said hardware module to the printer changes a printing standard controlling operation of the print head.

* * * * *